United States Patent [19]
Tomiyama et al.

[11] Patent Number: 5,695,561
[45] Date of Patent: Dec. 9, 1997

[54] DISK TRAY USED WITH AN APPARATUS FOR FORMING A PROTECTIVE FILM ON AN OPTICAL DISK

[75] Inventors: Hiroshi Tomiyama, Kanagawa; Shoji Akiyama, Saitama, both of Japan

[73] Assignee: Sony Corporation, Japan

[21] Appl. No.: 569,949

[22] Filed: Dec. 11, 1995

Related U.S. Application Data

[63] Continuation of Ser. No. 242,282, May 13, 1994, abandoned.

[30] Foreign Application Priority Data

May 14, 1993 [JP] Japan .................. 5-135083

[51] Int. Cl.$^6$ .................. B05B 5/025; B05C 5/00; B05C 9/08; C23C 16/00
[52] U.S. Cl. .................. 118/620; 118/729; 204/298.15; 250/504 R
[58] Field of Search .................. 118/500, 620, 118/642, 728, 729, 730; 369/275.1; 250/504 R; 204/298.15; 211/41

[56] References Cited

U.S. PATENT DOCUMENTS

| | | | |
|---|---|---|---|
| 4,055,769 | 10/1977 | Sander | 250/504 R |
| 4,357,366 | 11/1982 | Takaoka et al. | 369/275.1 |
| 4,447,468 | 5/1984 | Keable | 118/620 |
| 4,473,455 | 9/1984 | Dean et al. | 118/600 |
| 4,573,277 | 3/1986 | Sudduth | 118/692 |
| 4,589,369 | 5/1986 | Mahler | 118/725 |
| 4,644,899 | 2/1987 | Glaus | 118/642 |
| 4,735,701 | 4/1988 | Allen et al. | 118/500 |
| 4,754,141 | 6/1988 | Mindock | 250/504 R |
| 4,816,133 | 3/1989 | Barnett | 118/500 |
| 4,880,518 | 11/1989 | Akagawa et al. | 118/500 |
| 4,978,412 | 12/1990 | Aoki et al. | 118/620 |
| 4,996,992 | 3/1991 | de Boer et al. | 118/500 |
| 5,242,501 | 9/1993 | McDiarmid | 118/728 |
| 5,376,180 | 12/1994 | Mahler | 118/728 |

FOREIGN PATENT DOCUMENTS

| | | | |
|---|---|---|---|
| 59-194426 | 11/1984 | Japan | 118/620 |
| 1107543 | 4/1989 | Japan | 118/728 |
| 2197568 | 8/1990 | Japan | 118/728 |
| 3150361 | 6/1991 | Japan | 118/500 |
| 4122019 | 4/1992 | Japan | 250/504 R |
| 4283434 | 10/1992 | Japan | 369/275.1 |
| 6002144 | 1/1994 | Japan | 118/500 |
| 2127438 | 4/1984 | United Kingdom | 118/620 |

*Primary Examiner*—Donald E. Czaja
*Assistant Examiner*—Jacqueline A. Ruller
*Attorney, Agent, or Firm*—Limbach & Limbach L.L.P.

[57] ABSTRACT

A machine for forming a protective film on optical disks transports disks through stages in which a protective film is applied to their surfaces. The protective film is then set while the disks are located upon disk trays specifically configured to promote setting of the portion of the protective film overlying the outer circumferential end faces of the disks. The disk tray is provided with reflective surfaces which reflect ultraviolet rays against the outer circumferential end faces of the disks.

19 Claims, 9 Drawing Sheets

DISK TRAY USED WITH AN APPARATUS FOR FORMING A PROTECTIVE FILM ON AN OPTICAL DISK

This is a continuation of application Ser. No. 08/242,282 filed on May 13, 1994 now abandoned.

FIELD OF THE INVENTION

The present invention relates to the forming of a protective film on an optical disk in an optical disk manufacturing apparatus. In particular, the present invention relates to a disk tray to be used for setting a protective film applied to the surface of an optical disk by irradiating the disk with ultraviolet rays.

BACKGROUND OF THE INVENTION

Figure 9:
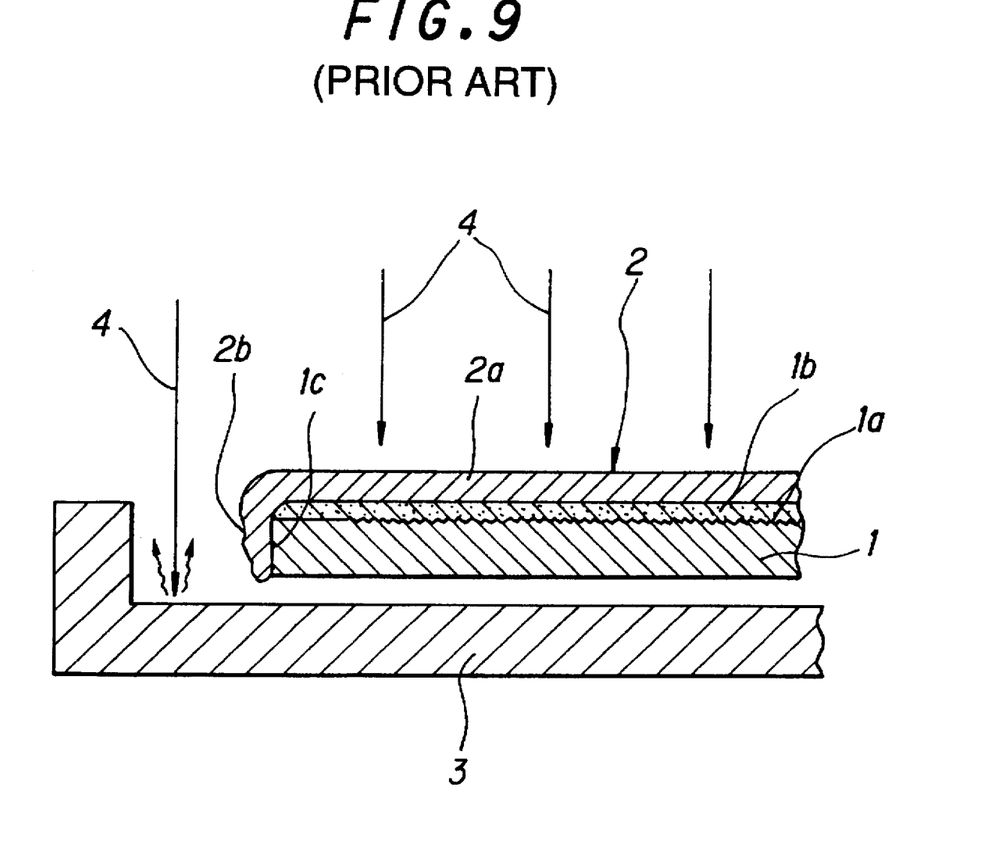
FIG. 9 shows an essential portion of the disk tray of the optical disk protective film forming machine of the prior art.

An example of a portion of machines used in the prior art to form protective films on an optical disk in an optical disk manufacturing apparatus is shown in FIG. 9. Such machines apply a protective film 2, which is a synthetic resin, to the surfaces of a reflective film 1b of aluminum formed on a signal face 1a of an optical disk 1 having an outer circumferential end face 1c.

Then, the optical disk 1 is placed horizontally on a disk tray 3 with its signal face 1a being directed upward. This optical disk 1 is then conveyed below an ultraviolet (UV) irradiator (not shown in this Figure) by the disk tray 3 so that it is irradiated with the ultraviolet rays 4 coming downward from a UV lamp to set the protective film. One problem with the above described prior art is that the outer circumferential end face 1c of the optical disk 1 is not sufficiently irradiated with the ultraviolet rays 4, as shown in FIG. 9, resulting in a longer setting time for that portion of the protective film 2b that covers the outer circumferential end face 1c than the portion 2a which covers the surface of the reflective film 1b.

In order to overcome this problem, a method was adopted for setting the entirety of the protective film 2 of the optical disk 1. According to this method, the protective film 2 is irradiated again with the ultraviolet rays 4 by taking advantage of the fact that the optical disk 1 is irradiated again with ultraviolet rays in order to dry ink that is used to print a label. The second irradiation is accomplished in the UV irradiator of a label printer in a subsequent step.

However, such a method makes the handling the optical disk 1 while conveying the disk from the UV irradiator of the protective film forming machine to the UV irradiator of the subsequent label printer is troublesome. If the outer circumferential layer 2b in a partially dry state (i.e., in an incompletely set state) is accidentally touched by a hand or a foreign object, the optical disk 1 has its appearance deteriorated resulting in a defective product. Moreover, the synthetic resin may drop unevenly on the outer circumferential layer 2b of the protective film 2 because of the vibration caused by conveying the optical disk 1.

SUMMARY OF THE INVENTION

The present invention overcomes the problems in the prior art and achieves additional advantages. An object of the present invention is to provide an optical disk protective film forming machine which can set the entirety of the protective film of an optical disk quickly and reliably by a single ultraviolet ray irradiating step.

In order to achieve the above-specified object, the optical disk protective film forming machine includes a disk tray for conveying an optical disk. A protective film, of the type that is set by UV rays, is applied to the surface of a reflective film, lying over a portion of the optical disk, as well as an outer circumferential end face of the optical disk. In order to completely set the protective film, the disk tray is formed with at least one annular reflective face for reflecting a portion of the ultraviolet rays that are used for irradiating the optical disk toward the outer circumferential end face of the optical disk.

In this way, even the outer circumferential end face of an optical disk can be reliably irradiated with ultraviolet rays by the reflection of a portion of the ultraviolet ray by an annular reflective face formed on a disk tray.

DETAILED DESCRIPTION OF THE PREFERRED EMBODIMENTS

A preferred embodiment of a machine for providing a protective film on an optical disk according to the present invention will now be discussed. The structural portions that are similar to those of FIG. 9 are designated by the same reference numerals so that repeated description may be omitted.

Figure 6:
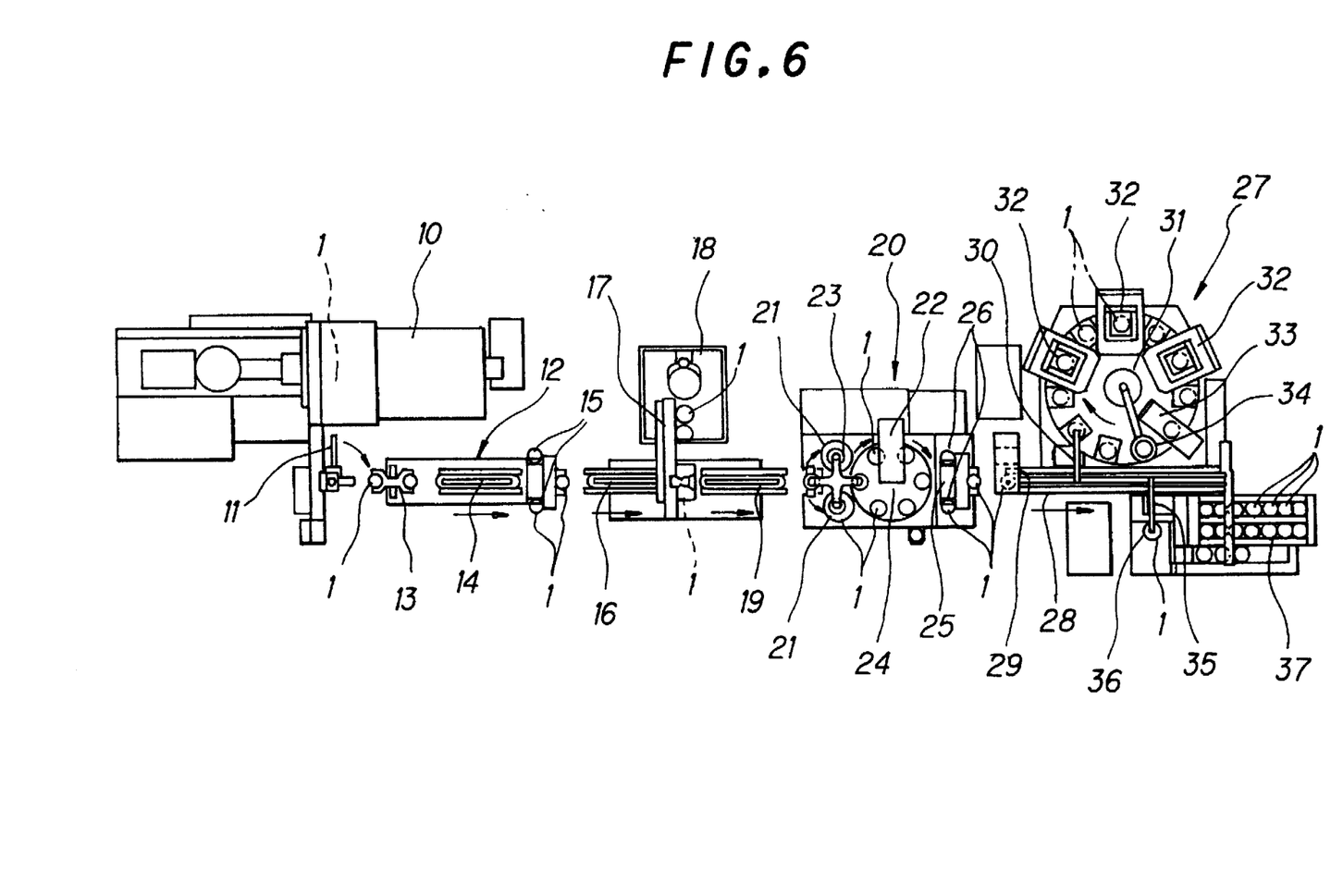
FIG. 6 illustrates a schematic top plan view showing the entirety of a disk manufacturing apparatus to which the optical disk protective film forming machine of the present invention is applied.

First of all, a summary of an optical disk manufacturing apparatus will be described with reference to FIG. 6. Arrows shown throughout this figure point to the direction in which the disks travel, which is generally left to right in the Figure. Optical disks 1 are sequentially injection-molded by an injection molding machine 10 and are sequentially extracted by way of a disk extractor 11 to a first disk conveyor 12.

This disk conveyor 12 receives the optical disks 1 from the disk extractor 11 by a rotary conveyor 13 and then conveys them sequentially with a line conveyor 14 such that the optical disks 1 have their signal faces directed upward.

If for some reason, the optical disks 1 cannot be conveyed, they are conveniently stocked in a stocker 15.

The optical disks 1 are then sequentially transferred from the line conveyor 14 to a next line conveyor 16 so that they are sequentially conveyed disk by disk. While optical disks 1 are being conveyed with their signal faces directed upward by those line conveyors 14 and 16, their signal faces are destaticized by an air blower.

Then, the optical disks 1, which were sequentially conveyed by the line conveyor 16 are extracted and inverted so as to have their signal faces directed downward by a disk extractor/invertor 17 until they are sequentially fed to a reflective aluminum film forming machine 18.

Then, the optical disks 1 have their signal faces formed with a reflective aluminum film by a sputtering method using the reflective aluminum film forming machine 18. Then, the optical disk 1 thus formed with the reflective films are extracted from the reflective aluminum film forming machine 18 by the disk extractor/invertor 17 and are fed to the next line conveyor 19 after their signal faces have been inverted upward again.

Then, the optical disks 1 thus formed with the reflective films are sequentially conveyed by line conveyor 19 so that they are sequentially fed to a protective film forming machine 20. The protective film forming machine 20 at first applies a protective film of a synthetic resin (of an ultraviolet set type) to the upper faces of the reflective films of the optical disks 1. The protective films are then set by irradiating them with ultraviolet rays, thus completing the optical disks 1.

While the aforementioned steps are being performed, the optical disks 1 are sequentially conveyed by a rotary conveyor 23 and a turntable 24 of the protective film forming machine 20. The optical disks 1 thus completed are sequentially extracted by a subsequent rotary conveyor 25 until they are stocked in a stocker 26.

Then, the optical disks 1 thus stocked in stocker 26 are sequentially fed by the rotary conveyor 25 to a line conveyor 28 of a label printer 27.

Then, while the optical disks 1 are being sequentially conveyed pitch by pitch by the line conveyor 28, their bar codes are first collated by a bar code reader 29. The optical disks 1 having passed through the bar code reader 29 are then sequentially fed by a disk extractor 30 to a turntable 31 of the label printer 27.

The turntable 31 has eleven stations, in which the optical disks 1 are sequentially printed at first with the label at three print stations 32 by a three- primary-color lapping method while being sequentially fed every three steps in the direction of arrow.

Then, the optical disks 1 thus printed with the label are irradiated with ultraviolet rays by a UV irradiator 33 while being sequentially conveyed by the turntable 31, so that their label inks may be dried and set. After this, the label printed faces are inspected by a printed face inspector 34.

Then, the optical disks 1 having their label printed faces inspected are sequentially extracted by a disk extractor 35 to a signal face inspector 36 so that their signal faces may be inspected. The optical disks 1 having their signal faces inspected are returned by the disk extractor 35 to the line conveyor 28 so that they are sequentially fed to a spindle stacker 37 at the final stage.

Figure 7:
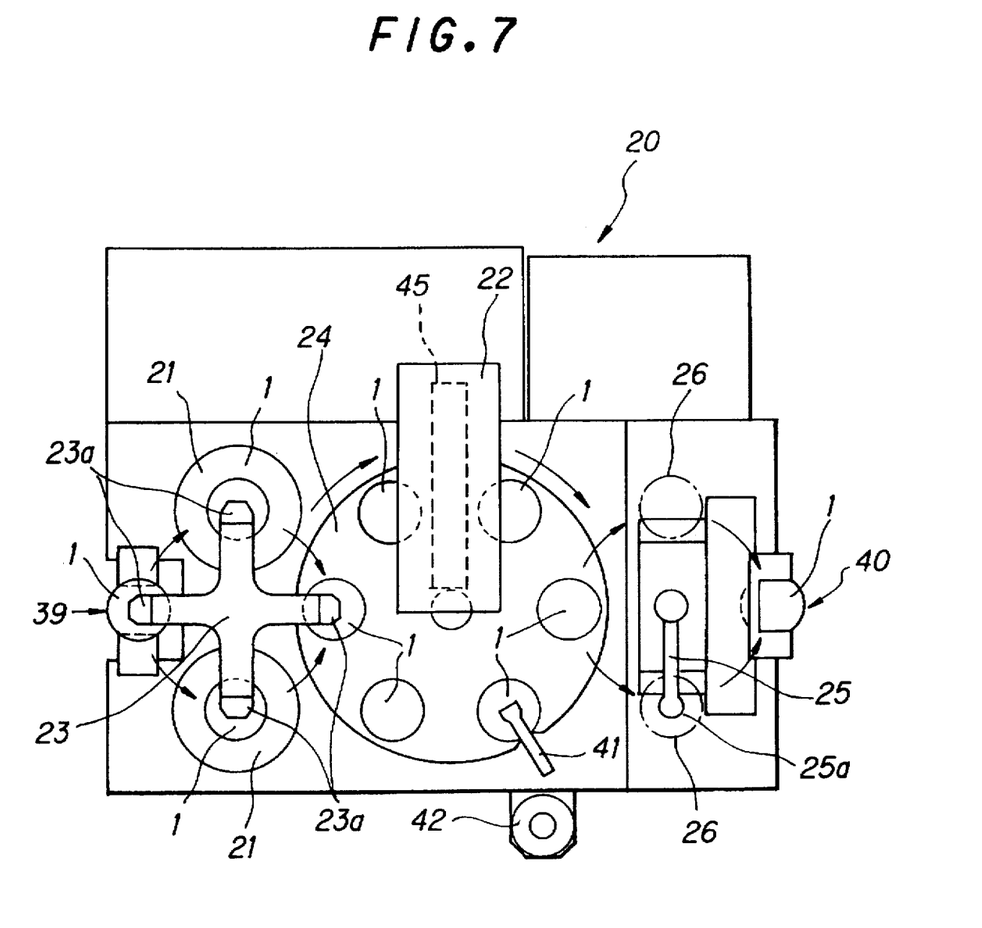
FIG. 7 is an enlarged view of the schematic top plan view of FIG. 7, showing the entirety of the optical disk protective film forming machine 20 of the present invention.

The protective film forming machine 20 of FIG. 6 will now be described in more detail with reference to FIG. 7.

In this protective film forming machine 20, the optical disks 1 fed by the line conveyor 19 to a disk feed position 38 are sequentially sucked and fed in to a pair of spinners 21 by a plurality of heads 23a of the rotary conveyor 23.

Then, the optical disks 1 having the protective films applied to the upper faces of their reflective films are sequentially sucked by the plurality of heads 23a of the rotary conveyor 23 and are sequentially fed in the direction of arrow to the subsequent turntable 24 by the paired spinner 21.

The turntable 24 is equipped with six trays 3 (shown in FIG. 7) that are equidistantly spaced from one another and from the center of turntable 24. Turntable 24 is intermittently turned station by station so that these six trays 3 are sequentially fed with the optical disks 1.

Then, the optical disks 1 thus fed to the disk trays 3 are sequentially moved below the UV irradiator 22 by the intermittent turns of the turntable 24 so that they are irradiated with the ultraviolet rays to set their protective films.

Then, the optical disks 1 are sucked by heads 25a of the subsequent rotary conveyor 25 so that they are sequentially extracted to the paired stockers 26. Then, the rotary conveyor 25 extracts the optical disks 1 sequentially to a disk discharge position 40. The disk are then sent to the linear conveyor 28 of the subsequent label printer 27. However, the optical disks 1, which have been found faulty at the previous step or in the spinners 21, are rejected from the turntable 24 by a rejector 41 and are discharged to a reject pole 42.

Figure 8:
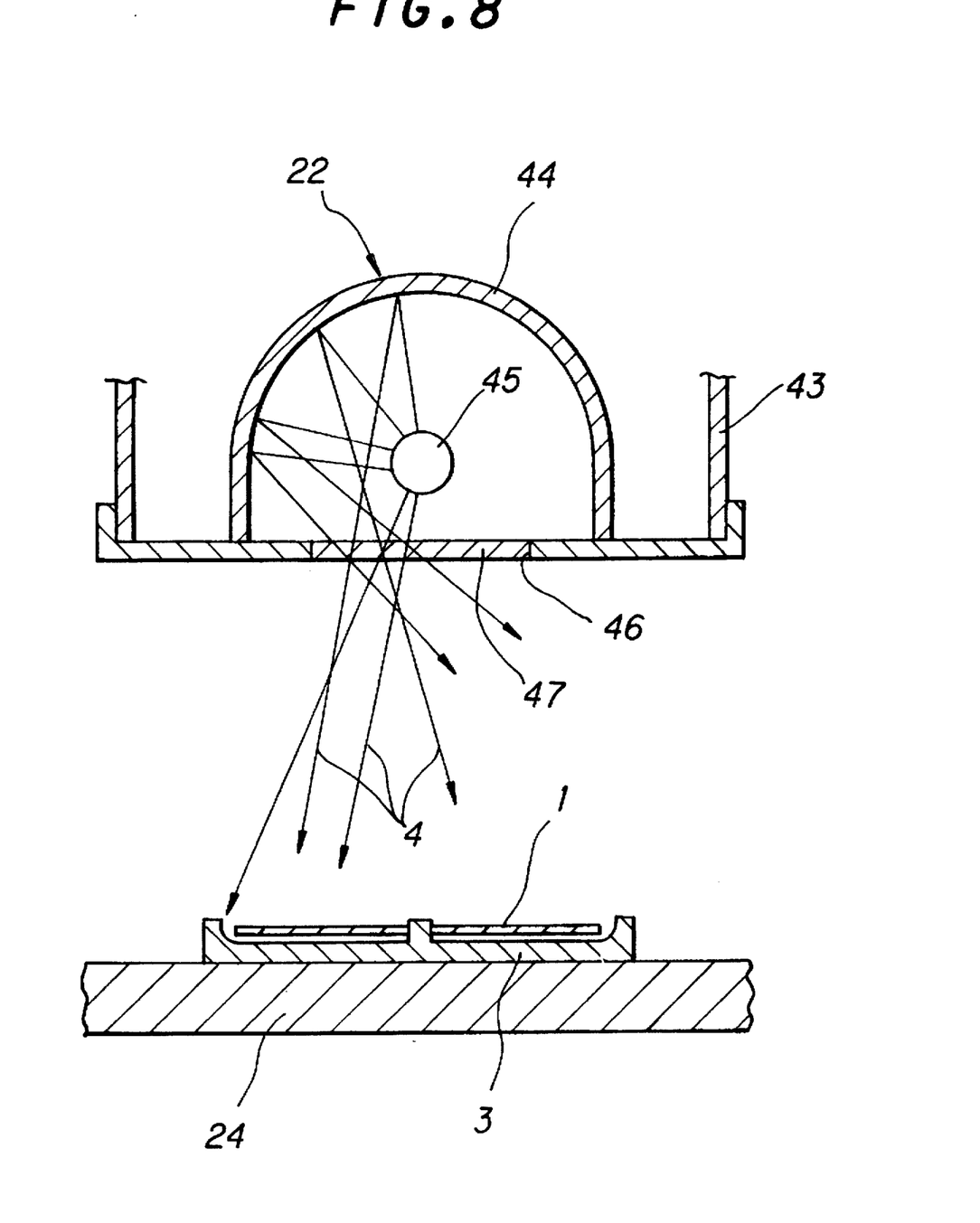
FIG. 8 illustrates disk tray and UV irradiator according to the optical disk protective film forming machine of the present invention.

The UV irradiator will now be described with reference to FIG. 8. This UV irradiator 22 is constructed by mounting a reflecting mirror 44 generally taking the shape of a half cylinder in a casing 43, and by disposing a UV lamp 45, acting as the UV light source, horizontally at a central position in the reflecting mirror 44. The UV aperture 46 formed in the lower face of the casing 43 is covered with a transparent glass shield 47.

The ultraviolet rays 4 emitted from the UV lamp 45 are reflected by the reflecting mirror 44 so that they are directed downward through the UV aperture 46. Thus, the protective film 2 (shown in FIG. 9) of the optical disks 1, which have been placed horizontally on the disk trays 3 and are being conveyed, are irradiated with the ultraviolet rays 4 for a predetermined time period to set the film.

Figure 4:
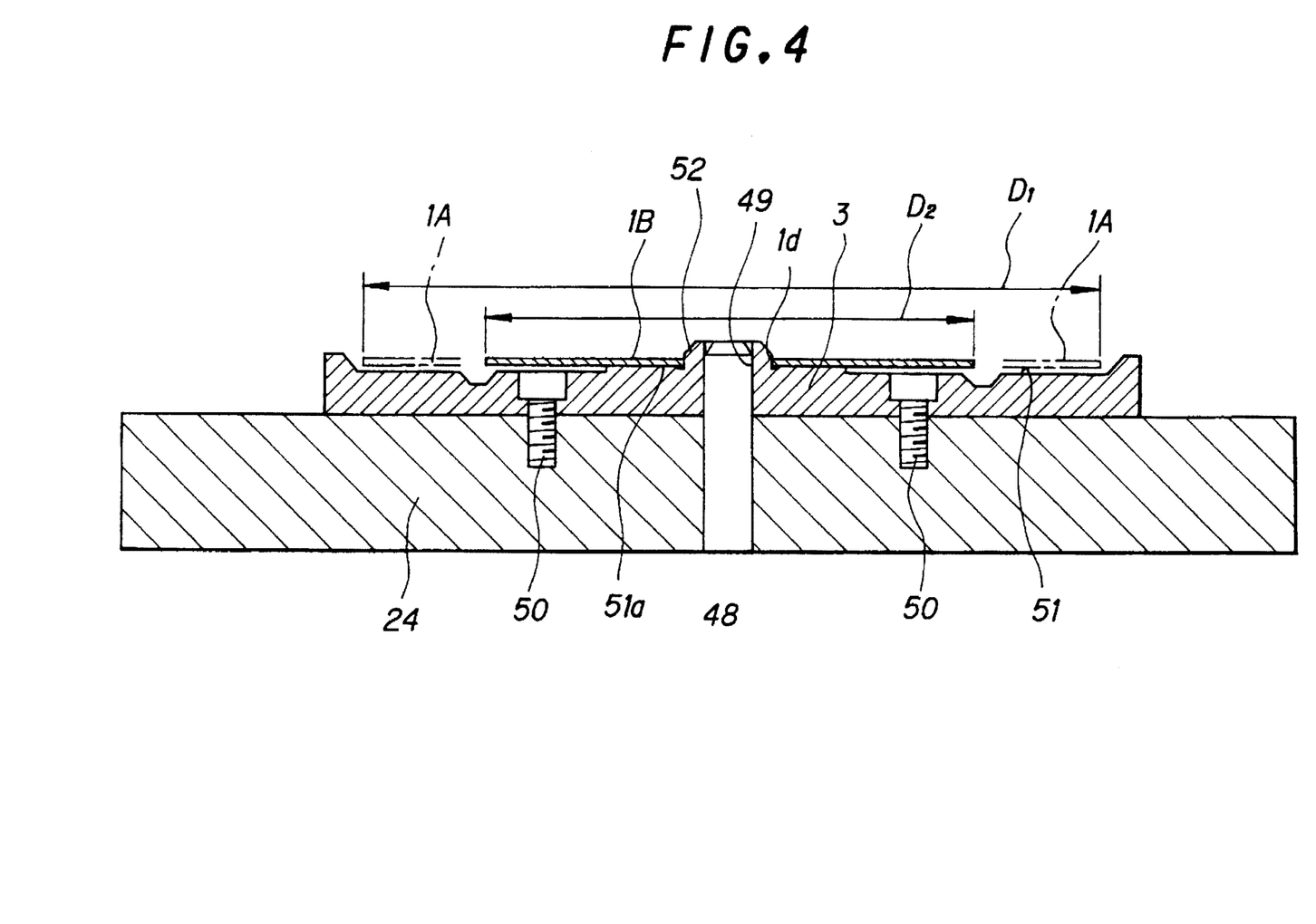
FIG. 4 illustrates a section showing the entirety of the disk trays of FIGS. 1 and 2.
Figure 5:
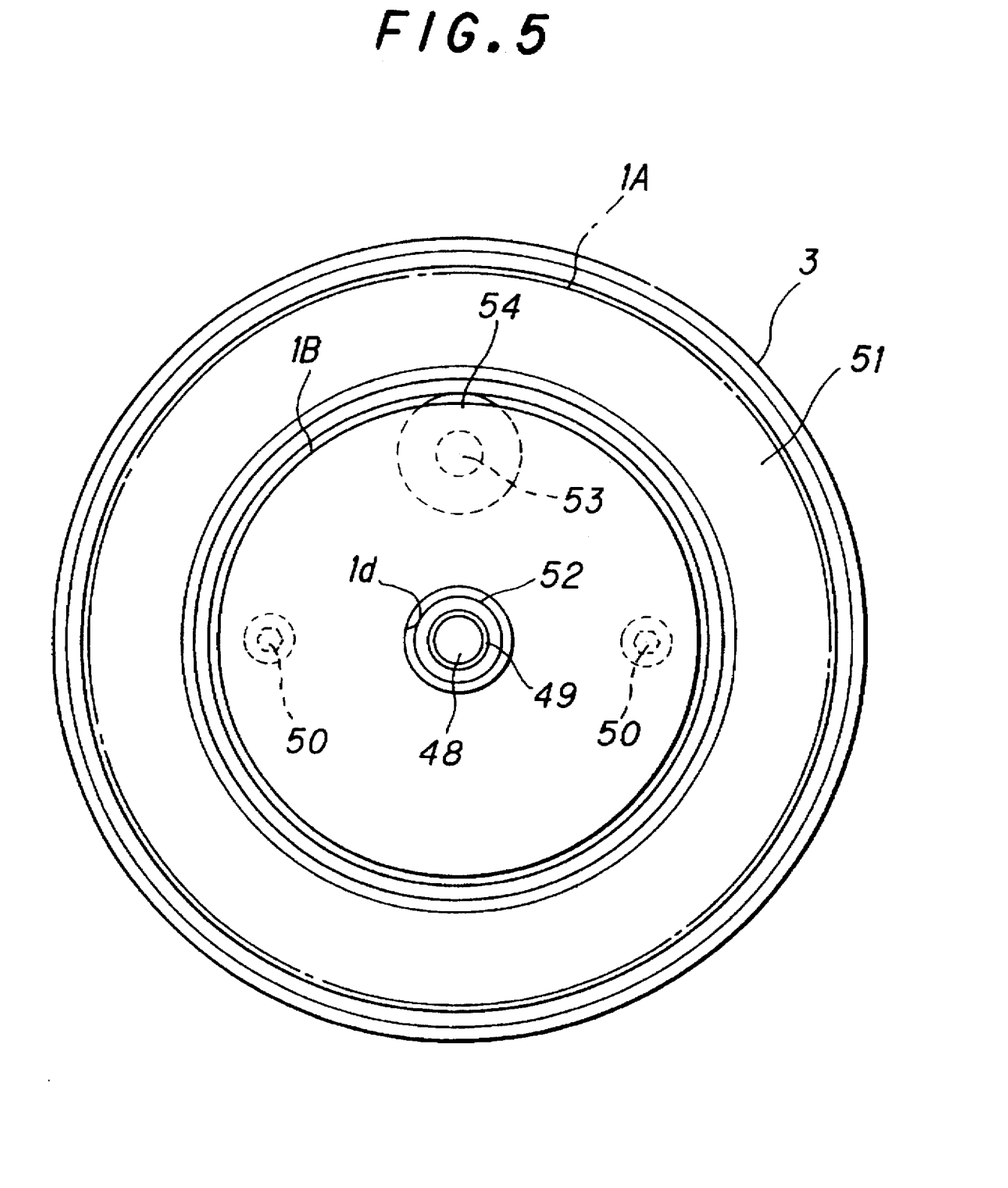
FIG. 5 illustrates a top plan view showing the entire disk tray of FIG. 4.

The disk tray according to a preferred embodiment of the present invention will be described in more detail in connection with FIGS. 4 and 5.

This disk tray 3 is placed horizontally on the turntable 24 as to have its center hole 49 fitted on a positioning pin 48 of the turntable 24 and is fixed on the turntable 24 by means of a plurality of bolts 50.

Moreover, the disk placing face 51 formed horizontally on the disk tray 3 has a disk positioning boss 52 at its center so that two types of optical disks 1A and 1B having different diameters of, for example, D1=12 cm and D2=8 cm can be interchangeably placed horizontally on the disk placing face 51 by having their center hole 1d fitted on the outer circumference of the boss 52. The optical disk 1A or 1B is placed such that it is slightly spaced from the disk placing face 51 by an annular step 51a formed on the inner circumference of the disk placing face 51.

The disk placing face 51 is provided with an optical detection hole 54 so that an optical sensor 53 may be used to detect the differing diameters of optical disks such as disks 1A and 1B.

The disk placing face 51 is provided with a pair of concentric, annular reflective faces 55 and 56 having different diameters larger than the diameters D1 and D2, respectively, of the different optical disks 1A and 1B.

Figure 1:
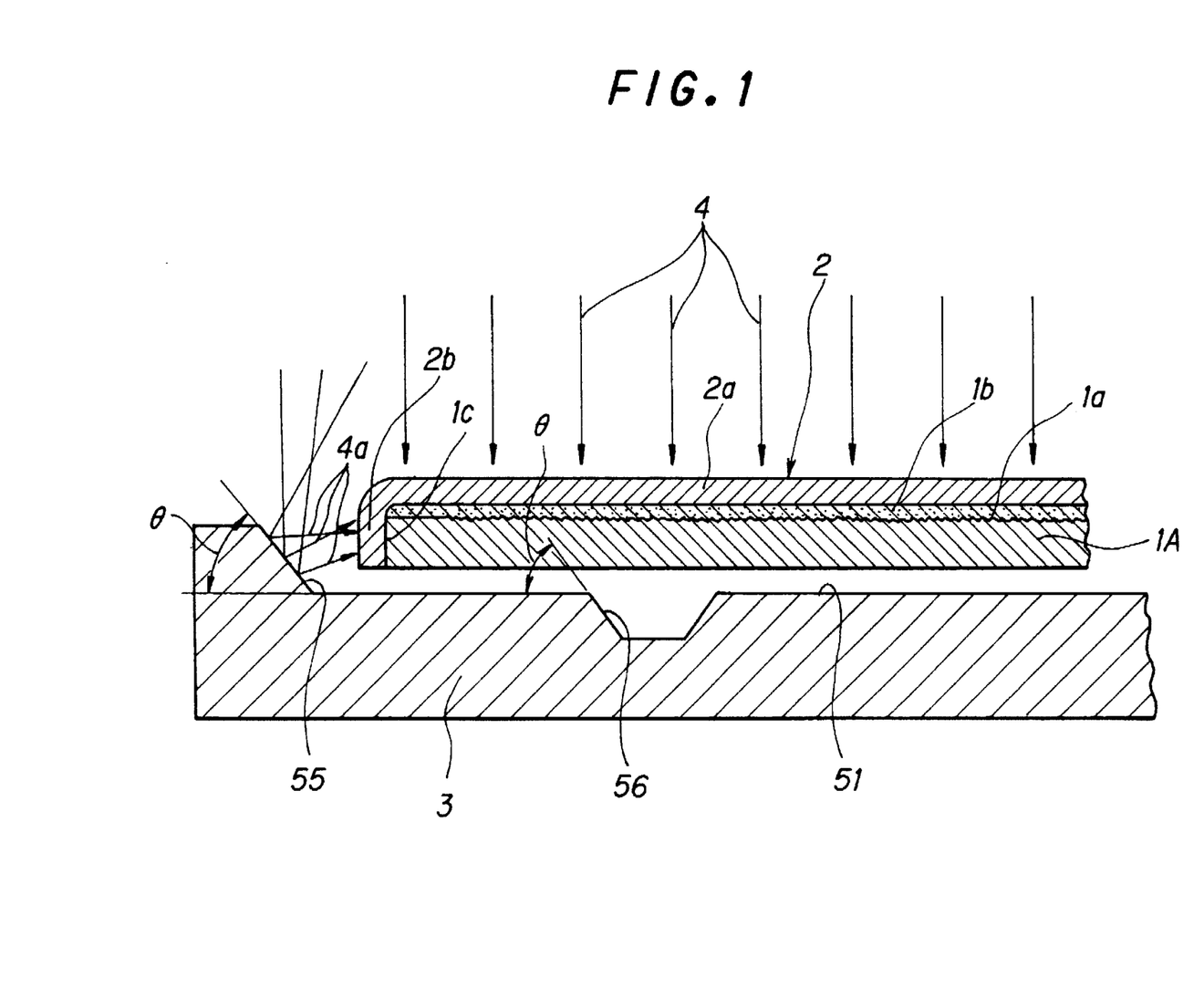
FIG. 1 illustrates an enlarged section showing an essential portion of a disk tray according to an embodiment of an optical disk protective film forming machine of the present invention where a disk of a large diameter is used.
Figure 2:
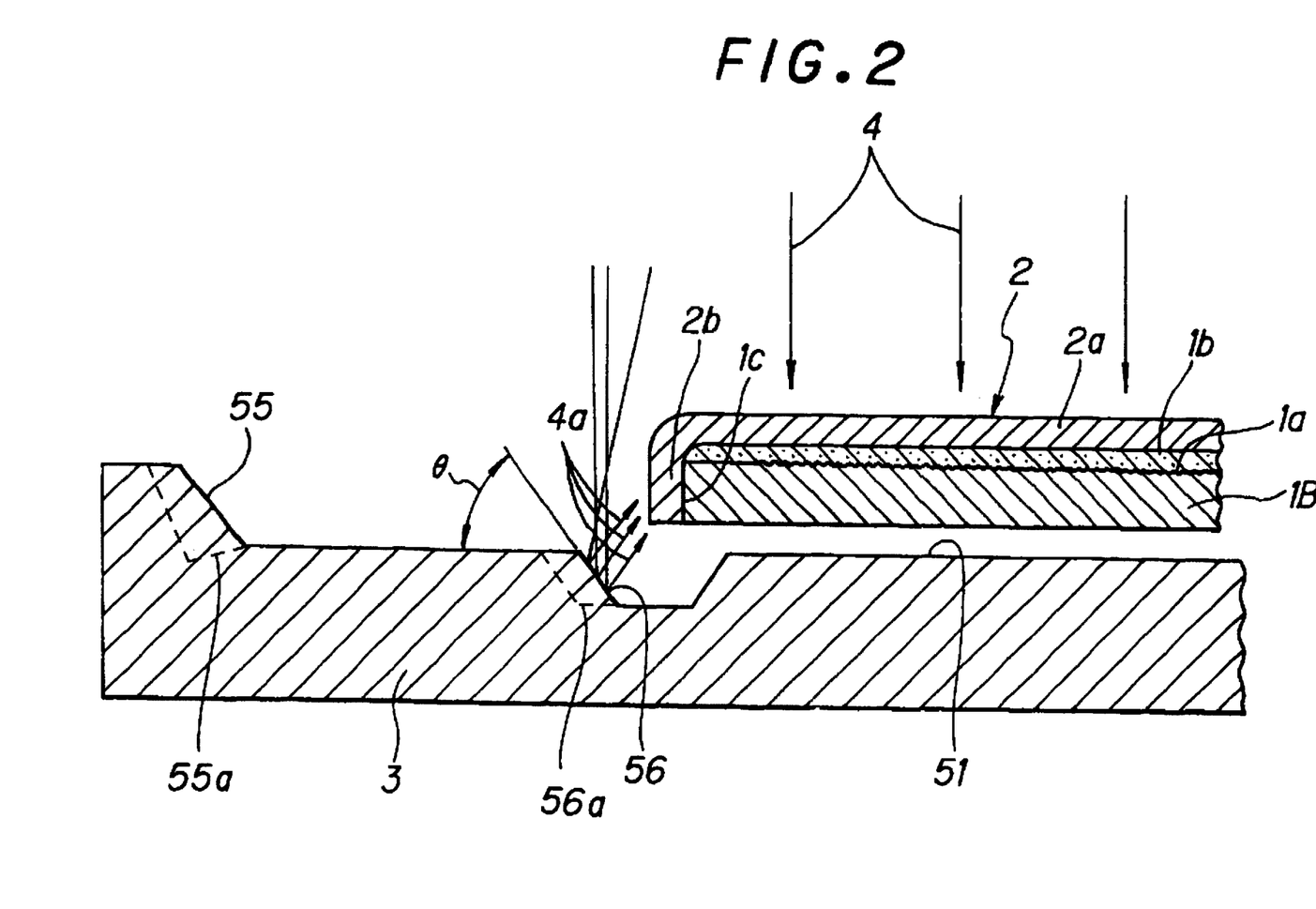
FIG. 2 illustrates an enlarged section showing an essential portion of the same disk tray as in FIG. 1, except that an optical disk of a small diameter is used.

The two reflective faces 55 and 56 will now be described in more detail in connection with FIGS. 1 to 3.

Reflective faces 55 and 56 are formed into slopes having an angle of inclination of about 45 degrees with respect to the disk placing face 51 and are finished into mirror faces. As a result, as shown in FIGS. 1 and 2, ultraviolet rays 4, which are guided downward to irradiate the protective film 2 of the optical disk 1A or 1B, can be reflected by reflective faces 55 and 56 as rays 4a toward the outer circumferential end face 1c of the optical disk 1A or 1B.

As a result, the protective film 2 can have its upper face layer 2a and its outer circumferential layer 2b irradiated simultaneously and reliably with the ultraviolet rays 4 and 4a so that it can be set quickly and reliably in a single ultraviolet ray irradiating step.

Figure 3:
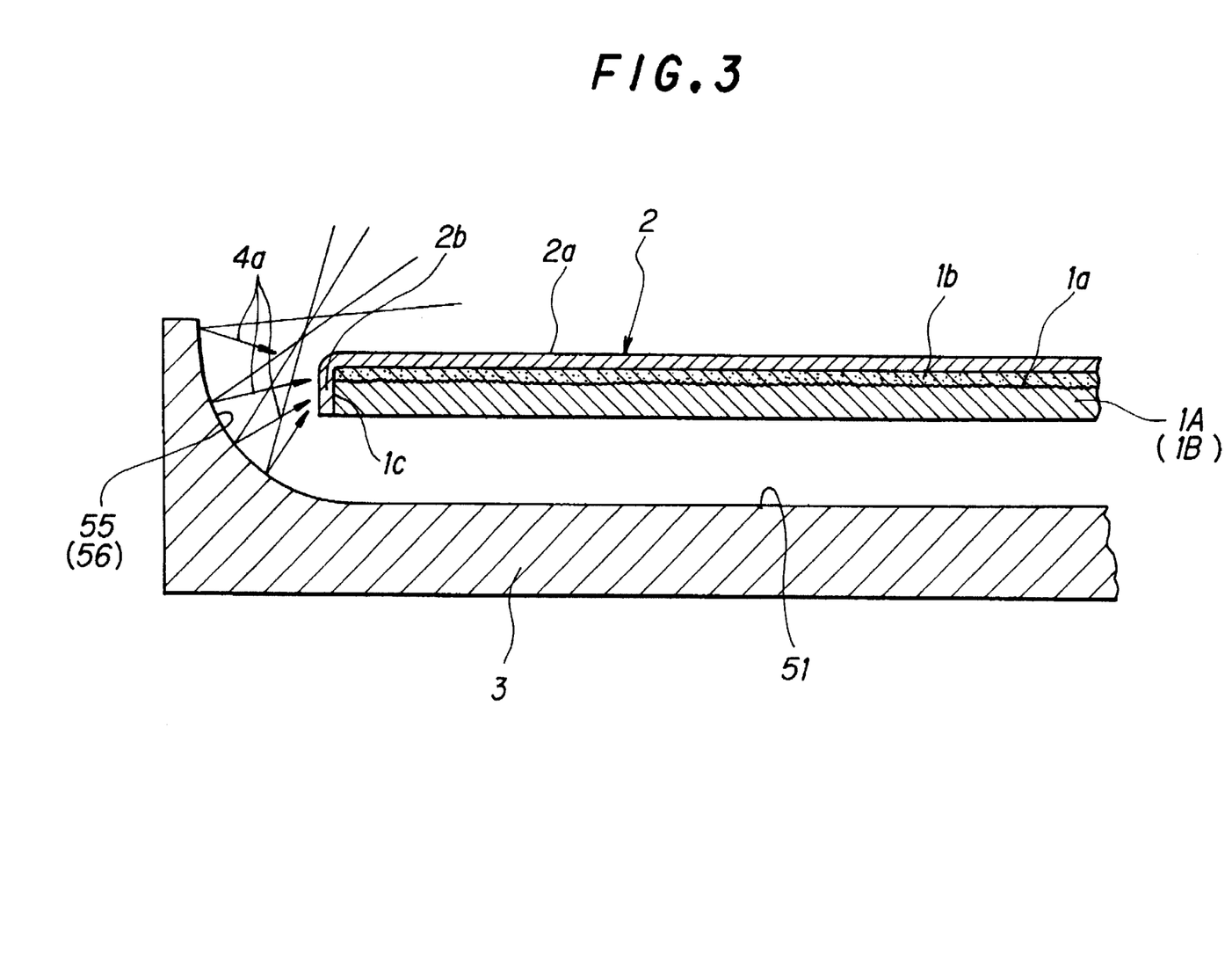
FIG. 3 illustrates an enlarged section showing an essential portion of a disk tray according to a second embodiment of the present invention

FIG. 3 shows a modification of the configuration of reflective faces 55 and 56. In this modification, the reflective face 55 or 56 is formed into a polygonal or curved concave mirror shape. Nonetheless, a similar effect is achieved.

For example, the reflective faces 55 and 56 are formed integrally with the disk tray 3 in the foregoing embodiments. However, reflective faces 55 and 56 may be separately formed and then adhered to the disk tray 3. (These separately formed and adhered reflective faces are graphically depicted in FIG. 4 by dotted lines 55a and 56a.)

The optical disk protective film forming machine thus constructed according to the present invention achieves the following effects. The rays used to irradiate the optical disk, having a protective film applied to its reflective face and outer circumferential end face surfaces, is partially reflected by the annular reflective face formed on the disk tray so that even the outer circumferential end face of the optical disk can be reliably irradiated. The advantage of this being, as stated above, that the protective film of the optical disk can be set quickly and reliably in its entirety. Thus, the optical disk can be easily handled and cleanly finished at its outer circumferential end face so that the yield of the unusable products can be reduced.

According to one embodiment, the aforementioned reflective faces are formed into a slope having an angle of inclination of about 45 degrees with respect to the optical disk placing face. Alternatively, according to another embodiment, the reflective faces are formed into a concave mirror shape, so that they can be easily formed integrally with the disk tray at a low cost.

Preferably, the aforementioned annular reflective faces are formed concentrically in plurality as to accommodate optical disks of different diameters that are interchangeably placed on the disk tray. This way, the steps of setting protective films on optical disks of different diameters can be carried out by a single disk tray, thereby resulting in an additional cost reduction. Although the discussion above has been made with respect to the preferred embodiments disclosed, one of ordinary skill in the art would be enabled by this disclosure to make various modification and still be within the scope and spirit of the present invention as embodied in the appended claims.

What is claimed is:

1. A disk tray for supporting an optical disk, which is coated with a protective film, so that the protective film may be set using ultraviolet rays, the disk tray comprising:
    a disk tray body;
    a disk placing face, fixed to the disk tray body, with a center and having a disk positioning boss at its center, the disk positioning boss being capable of supporting an optical disk; and
    an annular reflective surface fixed to the disk tray body, the annular reflective surface having a center coinciding with the center of the disk placing face.

2. The disk tray according to claim 1, wherein the annular reflective surface is inclined at a substantially 45 degree angle with respect to a plane in which the disk placing face lies.

3. The disk tray according to claim 1, wherein the annular reflective surface comprises a polygonal reflective surface.

4. The disk tray according to claim 1, wherein the annular reflective surface comprises a curved reflective surface.

5. The disk tray according to claim 1, wherein the annular reflective surface comprises a concave shaped reflective surface.

6. The disk tray according to claim 1, wherein the annular reflective surface is formed integrally with the disk tray body.

7. The disk tray according to claim 1, wherein the annular reflective surface is separately formed and adhered to the disk placing face.

8. A disk tray for supporting an optical disk, which is coated with a protective film, so that the protective film may be set using ultraviolet rays, the disk tray comprising:
    a disk tray body;
    a disk placing face, fixed to the disk tray body, with a center and having a disk positioning boss at its center, the disk positioning boss being capable of accommodating disks of various diameters;
    an optical detection means formed within the disk placing face for detecting the various diameters of disks accommodated by the disk positioning boss;
    a first annular reflective surface fixed to the disk tray body and having a first diameter, the first annular reflective surface having a center coinciding with the center of the disk placing face;
    a second annular reflective surface fixed to the disk tray body and having a second diameter different from the first diameter, the second annular reflective surface being formed concentrically with the first annular reflective surface.

9. The disk tray according to claim 8, wherein the first and second annular reflective surfaces are inclined at a substantially 45 degree angle with respect to a plane in which the disk placing face lies.

10. The disk tray according to claim 8, wherein the first and second annular reflective surfaces each comprise a polygonal reflective surface.

11. The disk tray according to claim 8, wherein the first and second annular reflective surfaces each comprise a curved reflective surface.

12. The disk tray according to claim 8, wherein the first and second annular reflective surfaces each comprise a concave shaped reflective surface.

13. The disk tray according to claim 8, wherein the first and second annular reflective surfaces are formed integrally with the disk tray.

14. The disk tray according to claim 8, wherein the first and second annular reflective surfaces are separately formed and adhered to the disk placing face.

15. The disk tray according to claim 1 wherein the optical disk has an upper surface and a lower surface, the disk placing face defines a planar surface which supports the lower surface of the optical disk, a downward direction is defined as the direction from the upper surface of the disk to the lower surface of the disk when the disk is supported on the disk placing face, and the annular reflective surface is located substantially downward of the planar surface of the disk placing face.

16. A disk tray for use in a machine for forming a protective film on an optical disk carried by the disk tray, wherein the protective film is applied to an upper surface and an outer circumferential end face of the optical disk, the protective film then being set using ultraviolet rays, the disk tray comprising:

a disk tray body;

a first annular reflective surface having a first diameter formed integrally with the disk tray body for reflecting a portion of the ultraviolet rays toward the outer circumferential end face of a first optical disk; and a second annular reflective surface formed integrally with the disk tray body, having a second diameter different than the first diameter, for reflecting a portion of the ultraviolet rays toward the outer circumferential end face of a second optical disk.

17. An optical disk protective film forming machine comprising:

a disk tray for conveying an optical disk, the optical disk having an upper surface and an outer circumferential end face, wherein an ultraviolet ray set type of protective film is applied to the upper surface and the outer circumferential end face, the protective film being set by irradiating the optical disk with ultraviolet rays, and wherein said disk tray includes:

a disk tray body for supporting the optical disk; and an annular reflective surface formed integrally with the disk tray body for reflecting a portion of the ultraviolet rays toward the outer circumferential end face of the optical disk; and a turntable for holding at least one disk tray, with the turntable moving the disk tray between a first position where it receives the optical disk, and a second position where the optical disk is exposed to ultraviolet rays.

18. A disk tray according to claim 16 wherein the first annular reflective surface is formed by finishing a portion of a surface of the disk tray body to a mirror face.

19. A disk tray for use in a machine for forming a protective film on an optical disk carried by the disk tray, wherein the protective film is applied to an upper surface and an outer circumferential end face of the optical disk, the protective film then being set using ultraviolet rays, the disk tray comprising:

a disk tray body;

a first annular reflective surface having a first diameter separately formed and adhered to the disk tray body for reflecting a portion of the ultraviolet rays toward the outer circumferential end face of a first optical disk; and a second annular reflective surface formed integrally with the disk tray body, having a second diameter different than the first diameter, for reflecting a portion of the ultraviolet rays toward the outer circumferential end face of a second optical disk.

* * * * *